United States Patent [19]

Yamashita et al.

[11] Patent Number: 4,859,931

[45] Date of Patent: Aug. 22, 1989

[54] ELECTRONIC DETECTOR WITH CAPACITOR SENSOR AND MAGNETIC FIELD SENSOR FOR LOCATING AN OBJECT BEHIND A WALL SURFACE

[75] Inventors: Mikihiro Yamashita; Kaoru Furukawa, both of Hikone, Japan

[73] Assignee: Matsushita Electric Works, Ltd., Japan

[21] Appl. No.: 130,614

[22] Filed: Dec. 9, 1987

[30] Foreign Application Priority Data

Dec. 23, 1986 [JP] Japan ................................ 61-306845

[51] Int. Cl.[4] .................... G01R 33/00; G01R 27/26; G01V 3/11
[52] U.S. Cl. ................................ 324/67; 324/61 R; 324/236; 331/65
[58] Field of Search .................. 324/61 R, 61 P, 67, 324/326–329, 207, 208, 236; 340/551, 562, 686; 307/116, 309; 361/179–181; 331/65

[56] References Cited

U.S. PATENT DOCUMENTS

| 3,609,735 | 9/1971 | Dauterman et al. | 324/61 R X |
| 3,764,819 | 10/1973 | Muller | 340/562 X |
| 4,099,118 | 7/1978 | Franklin et al. | 324/61 R |
| 4,686,454 | 8/1987 | Pecukonis | 324/67 |

FOREIGN PATENT DOCUMENTS

| 3235535 | 3/1984 | Fed. Rep. of Germany | 324/326 |
| 818740 | 8/1959 | United Kingdom | 324/67 |
| 87/00933 | 2/1987 | World Int. Prop. O. | 324/329 |

Primary Examiner—Gerard R. Strecker
Attorney, Agent, or Firm—Stevens, Davis, Miller & Mosher

[57] ABSTRACT

An electronic detector for locating an object behind a wall surface has a metallic object detecting section and a general object detecting section which are energized by a common battery to be operative simultaneously. The metallic object detecting section includes a magnetic field sensor for detecting any change in a magnetic field developed therearound and providing a second electric signal indicative of that change. The general object detecting section includes a capacitor sensor for sensing any change in the capacitance of the wall and providing a first electric signal indicative of that change. The first and second electric signals are applied respectively to first and second control circuits where they are analyzed to provide first and second control outputs when their levels reach first and second reference levels, respectively. Upon receiving the first and second control output, first and second indicators turn on for indicating the detection results. Thus, both of the first and second indicators will turn on when there is detected a metallic object behind the wall surface and only the first indicator will turn on when there is deteced a non-metallic object behind the wall surface, whereby the user can easily distinguish the metallic object and the non-metallic object detected.

8 Claims, 8 Drawing Sheets

ELECTRONIC DETECTOR WITH CAPACITOR SENSOR AND MAGNETIC FIELD SENSOR FOR LOCATING AN OBJECT BEHIND A WALL SURFACE

BACKGROUND OF THE INVENTION

1. Field of the invention

The present invention is directed to an electronic detector for locating an object behind a wall surface, and more particularly, to such a detector capable of distinguishing between a metallic object and non-metallic object concealed behind a wall surface.

2. Description of the prior art

There is already known an electronic wall stud detector which is utilized to move along a wall surface to detect a wall stud or the like behind the wall surface, as proposed in U.S. Pat. No. 4,099,188. The patent disclose the sensor which detects the presence of the stud behind the wall surface by measuring a change in the capacitance of the wall due to the presence of the stud. Although the detector is found useful in many sites, it is not satisfactory in a particular site where it is required to distinguish between a non-metallic object and a metallic object such as metal pipes for water and electric cables routed within the wall, since such metallic object should be kept harmless when a nail or the like member is driven into the wall. It is therefore most desirable to distinguish the metallic object and the non-metallic object both positioned within the wall.

SUMMARY OF THE INVENTION

The present invention has been accomplished in view of the above and presents a useful and improved detector for locating an object behind a wall surface. The detector in accordance with the present invention includes a capacitor sensor for sensing any change in the capacitance of a target wall along which the detector is to be moved so as to provide a first electric signal indicative of that change. The first control circuit is cooperative with the capacitor sensor to analyze the first electric signal and produce a first control output when the level of the first electric signal reaches a first reference level. A first indicator is connected to the first control circuit so that it produces an indication upon receiving the first control output for indicating the presence of either a metallic or non-metallic object behind the wall surface. The detector further comprises an magnetic field sensor for creating a magnetic field therearound and detecting any change in the magnetic field so as to provide a second electric signal indicative of that change. The electric signal is fed to a second control circuit where it is analyzed to produce a second control output when the level of the electric signal reaches a second reference level. Connected to the second control circuit is a second indicator which produces an indication upon receiving the second control output to indicate the presence of a metallic object in proximity to the magnetic field sensor. Thus, the first and second indicator will provide indications simultaneously when the metallic object is detected behind the wall surface while the first indicator alone provides its indication when the non-metallic object is detected, whereby one can easily distinguish the metallic and non-metallic object detected with a single detector device.

Accordingly, it is a primary object of the present invention to provide a detector for locating an object behind a wall surface which is capable of distinguishing a metallic object from an non-metallic object. Included in the first and second control circuits are individual calibration means in which the first and second reference levels are respectively made variable so that they are set upon the initial energization of the circuits to a value at which the first and second indicators respond to turn from the indicating condition to the non-indicating condition, respectively.

It is therefore another object to provide a detector for locating an object behind a wall surface which is capable of self-calibrating for providing an optimum sensitivity to a particular wall intended so as to ensure a most reliable detection of metallic and non-metallic objects behind the surface thereof.

For this purpose, each calibration means is arranged to turn each of the first and second indicators into the indicating condition upon the initial energization of the device and to vary each of the first and second reference levels in a direction of turning the each indicator into its non-indicating condition in order to determine each individual reference level to and latch into a value at which each indicator is turned first to the non-indicating condition. With this configuration, the user can easily be assured the completion of the calibration sequence by the respective indicators being turned into the non-indicating conditions from the indicating condition.

It is therefore a further object to provide a detector for locating an object behind a wall surface of which initial calibration sequence for each of the first and second control circuits can be easily recognized by utilization of the respective indicators.

The present invention discloses still other advantageous features which will become apparent from the following detailed description of the invention when taken in conjunction with the accompanying drawings.

DESCRIPTION OF THE PREFERRED EMBODIMENTS

Figure 1:
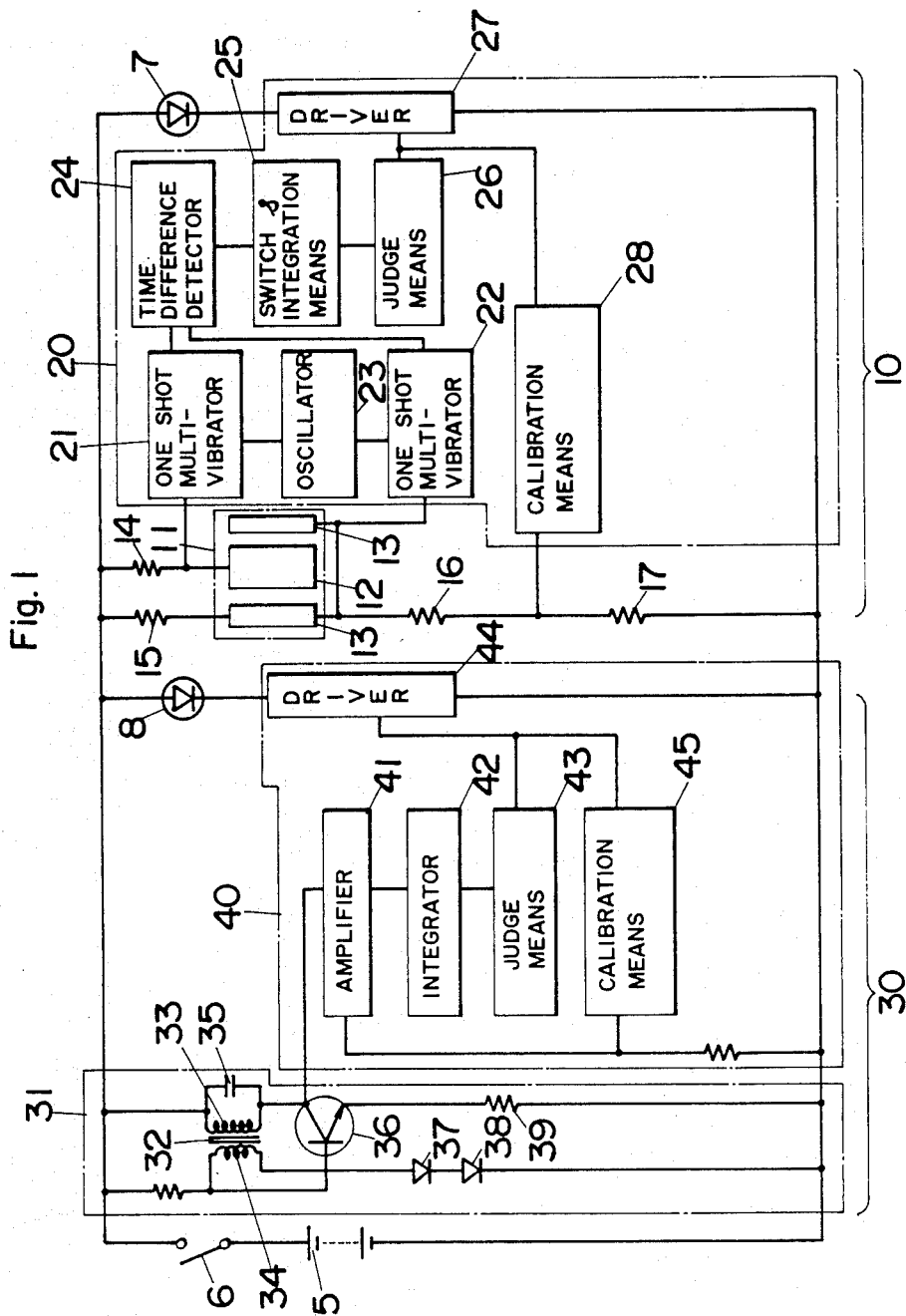
FIG. 1 is a circuit diagram of a combination detector for locating metallic and non-metallic objects behind a wall surface in accordance with a first embodiment of the present invention.
Figure 2:
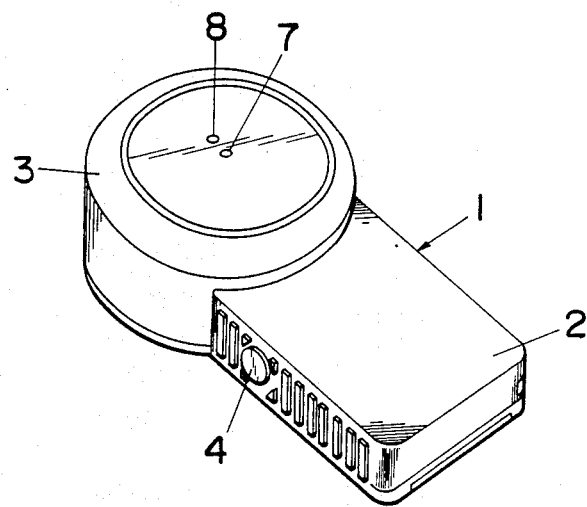
FIG. 2 is a perspective view of the detector.
Figure 3:
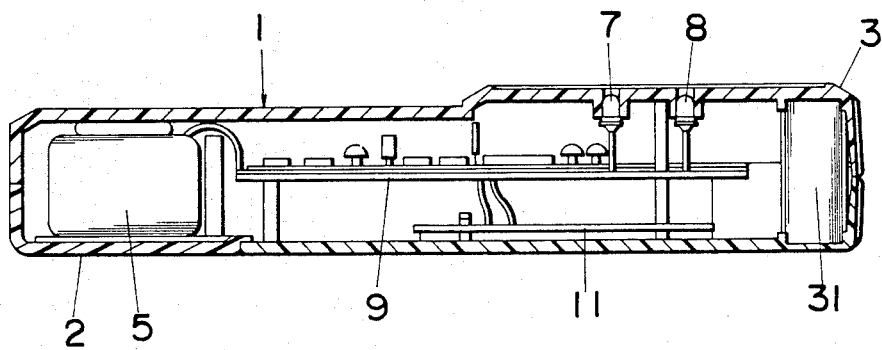
FIG. 3 is a sectional view of the detector.

Referring now to FIGS. 1 to 3, there is shown a combination detector for locating metallic and non-metallic objects behind a wall surface in accordance with a first embodiment of the present invention. The detector comprises a number of electric components forming a circuit of FIG. 1 which are accommodated in a flat-shaped casing 1 with a rectangular grip 2 and a round head 3, as shown in FIGS. 2 and 3. The detector is in use to be moved along the surface of a wall with its bottom flat surface held in close proximity thereto for locating metallic and non-metallic objects behind the wall surface. The grip 2, which is grasped by the hand of the operator, is provided with a switch button 4 for energizing the circuit by a battery 5 also mounted within the grip 2. A pair of light emitting diodes (LEDs) 7 and 8 are exposed onto the upper surface of the head 3 and aligned on a longitudinal center axis of the casing 1 so as to define a center mark of the detector.

Referring to FIG. 1, the circuit is mainly composed of a general object detecting section 10 (right hand of the figure) and a metallic object detecting section 30 (left half of the figure), these sections 10 and 30 having the common battery 5 as a source of power and a common main switch 6 to be actuated by the switch button 4 for simultaneous energization. The general object detecting section 10 comprises a capacitor sensor 11 which senses any change in the capacitance of the wall. The sensor 11 includes a set of capacitor plates 12 and 13 which form with resistors 14 to 17 individual time constant determining circuits. The sensor 11 is connected to a first control circuit 20 which provides a first reference level upon the initial energization of the circuit and analyzes the capacitance sensed by the sensor 11 so as to provide a control output to a driver 27 for causing the LED 7 to light when the capacitance sensed reaches to the first reference level. Although the LED 7 is employed as an indicator, it may be any other indicating means emitting light or sound as is necessary.

Figure 4:
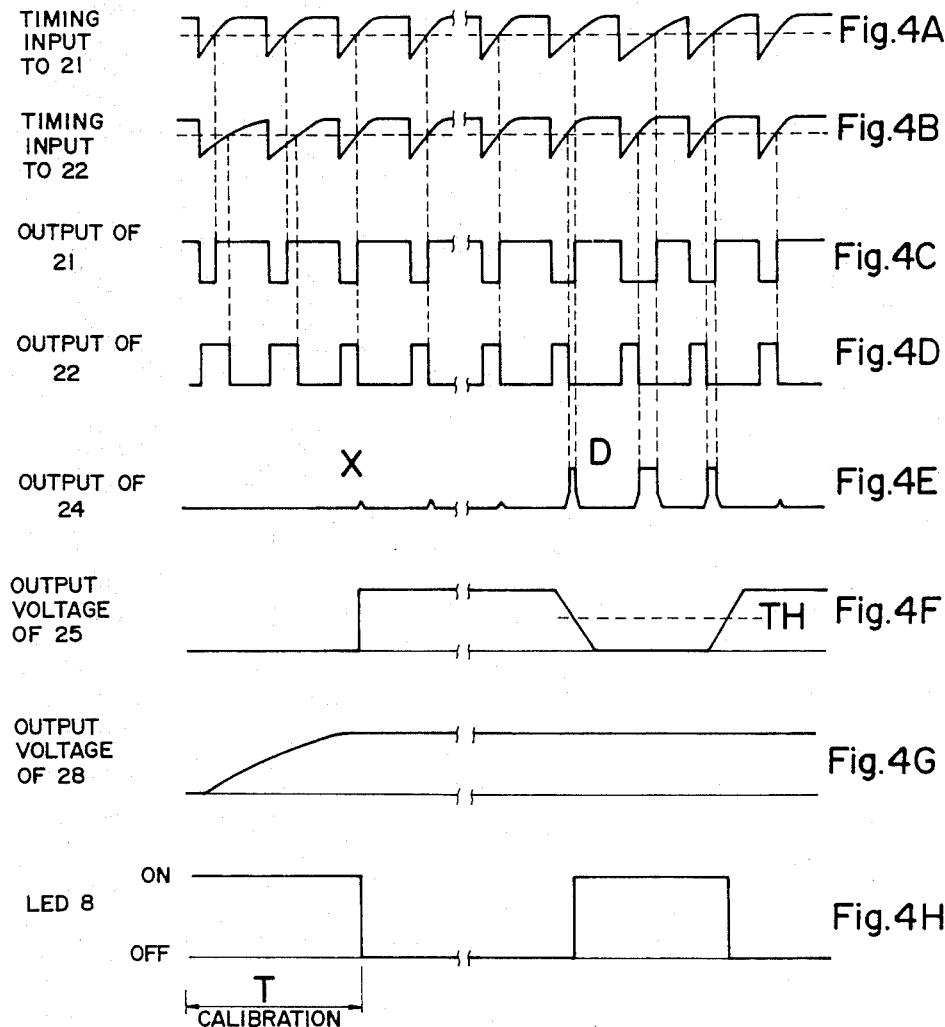
FIGS. 4A to 4H are respectively waveform charts illustrating the operation of a first control circuit responsible for detection of a metallic or non-metallic object.

The first control circuit 20 comprises a pair of one shot multivibrators 21 and 22 driven by an oscillator 23 to be triggered simultaneously at a constant rate. The main capacitor plate 12 forms with the resistor 14 the time constant determining circuit which applies a timing input (FIG. 4A) to the multivibrator 21 so that the multivibrator 21 provides a pulse (FIG. 4C) of which width is determined by the capacitance of the plate 12 and the resistance 14. The auxiliary capacitor plates 13 form with the resistors 15, 16 and 17 another timing determining circuit which applies a timing input (FIG. 4B) to the other multivibrator 22 so that the multivibrator 22 provides a pulse (FIG. 4D) of which width is determined by the capacitance of the plates 13 and the resistance 15, 16 and 17. The plates 13 are smaller in the total area than the main plate 12 and responsible for causing the multivibrator 22 to provide the pulse (FIG. 4D) of standard width with which that of the output pulse (FIG. 4C) of the multivibrator 21 is compared for identifying the presence of an object behind the wall which causes a change in the dielectric constant of the wall.

The outputs of the multivibrators 21 and 22 are applied to a time difference detector 24 where they are processed to obtain a time difference between the termination thereof. The time difference is shown in the form of an output signal of FIG. 4E from which it is seen that a pulse is produced only while the outputs of the multivibrators 21 and 22 are simultaneously at a low level and that the level of that pulse is proportional to the time difference between the termination of the output pulses of the multivibrators 21 and 22.

Coupled to the time difference detector 24 is a combination switch & integration means 25 which has dual functions of causing a judge means 26 to provide a control output of turning on the LED 7 upon detection of any such time difference (at X in FIG. 4E) only once after the initial energization of the circuit and of providing to the judge means 26 an output voltage (FIG. 4F) representative of the time difference provided that the former function has been performed. At the judge means 26, the output voltage of the switch & integration means 25 is compared with a predetermined threshold level so as to provide to the driver 27 the control output of turning on the LED 7 when the output voltage goes below the threshold level, otherwise the LED 7 is kept turned off. It should be noted at this point that the switch & integration means 25 provides the output voltage (FIG. 4F) of which level is low enough to turn on the LED 7 until it sees the first pulse X indicating the occurrence of slight time difference between the output pulses of the multivibrators 21 and 22. And once the first pulse X is seen, the output voltage of the switch & integration means 25 goes to a level just above the threshold level TH after which the output voltage will be reduced by an amount corresponding to the time difference between the multivibrators 21 and 22. Also included in the first control circuit 20 is a calibration means 28 which is set upon the initial energization of the circuit to apply such an increasing voltage (FIG. 4G) to the time constant determining circuit of the capacitor plates 13 connected to the multivibrator 22 that reduces the time constant or the width of the standard output pulse (FIG. 4D) of the multivibrator 22 until there first occurs any time difference X between the termination of the outputs of the multivibrators 21 and 22. Once this occurs, the calibration means 28 is latched into a state of applying a constant voltage to the time determining circuit of the multivibrator 22 so that the width of the pulse (FIG. 4D) from the multivibrator 22 is kept at a constant value to be ready for subsequent operation of monitoring any change in the capacitance of the sensor 11 or the target wall. During this initial energization period T, the LED 7 is kept turned on to indicate that the calibration sequence is in progress. Thus, in this sequence the output voltage applied to the judge means 26 can be automatically adjusted to be just above the threshold level TH with which it is to be compared in the subsequent operation, thereby determining the above first reference level as a most effective or sensitive value in detecting any change in the capacitance of the target wall as it compensates for varing characteristics from the wall to wall, and therefore providing a most reliable detection of the presence of a metallic or non-metallic object behind a wall surface. After the calibration sequence is completed, the general object detecting section 10 can be prepared to continue monitoring any substantial change in the capacitance of the target wall during which period the LED 7 will turn on when there is sensed that change due to the presence of a metallic or non-metallic object in proximity to the capacitor sensor 11, which is shown at a time D in FIG. 4E.

Now turning back to FIG. 1, the metallic object detecting section 30 comprises a oscillator 31 which produces an alternating magnetic field therearound and in turn senses any change in the strength of the magnetic field to provide a second electric signal indicative of that change, thus serving as a magnetic field sensor. Connected to the magnetic field sensor 31 is a second control circuit 40 which provides a second reference level upon the initial energization of the circuit and analyzes the second electric signal applied from the magnetic field sensor 31 so as to provide an output to a driver 44 for causing the LED 8 to light when the second electric signal has a level greater than the second reference level. Although the LED 8 is employed as an indicator, it may be any other indicating means emitting light or sound as is necessary.

The magnetic field sensor or oscillator 31 comprises a transformer 32 of which primary winding 33 is connected across a capacitor 35 to form a resonant circuit, and a transistor 36 having its collector connected to the resonant circuit. The secondary winding 34 of the transformer 32 is connected at its one end in a negative feedback manner to the base of the transistor 36, and connected at the other end to a series of diodes 37 and 38. These diodes 37 and 38 are provided to properly bias the transistor 36 in order to actuate the oscillator 31 upon closing of the main switch 6 as well as to compensate for possible variations in a resistor 39 coupled to the emitter of the transistor 36. The oscillator or magnetic field sensor 31 produces an electric signal of oscillation at the connection between the collector of the transistor 36 and the resonant circuit formed by the primary winding 33 and the capacitor 35. Thus, when there is a metallic object within the reach of the magnetic field developed around the transformer 32, the magnetic field suffers from an eddy current loss due to the presence of the metallic object, thereby varying the coupling coefficient between the primary winding 33 and secondary winding 34 to reduce the output level of the electric signal from the magnetic field sensor 31.

The second control circuit 40 includes an amplifier 41 amplifying the alternating component of the electric signal from the sensor 31, an integrator 42 processing the amplified electric signal to provide an output voltage proportional to the level thereof, and a judging means 43 providing a control output to the driver 44 that causes the LED 8 to light when it is judged that the output voltage reduces to a predetermined threshold level. Also included in the second control circuit 40 is a calibration means 45 which sets the amplification factor of the amplifier 41 at a minimum upon the initial energization of the circuit to thereby cause the judge means 43 to provide the control output of turning on the LED 8, as the voltage output level from the amplifier 41 is kept low enough to simulate the reduction in the level of the electric signal from the magnetic field sensor 31, or the presence of a metallic object in proximity to the sensor 31. Subsequently, the calibration means 45 is operative to increase progressively the amplification factor of the amplifier 41 until it receives from the judge means 43 a signal indicating that the judge means 43 stops to provide the control output, or that the output level of the integrator 42 rises just above the threshold level to turn off the LED 8. Immediately after receiving such output from the judge means 43, the calibration means 45 will act to fix or latch the amplification factor of the amplifier. 41 into that value, making the metallic object detecting section ready for actual operation.

Figure 5:
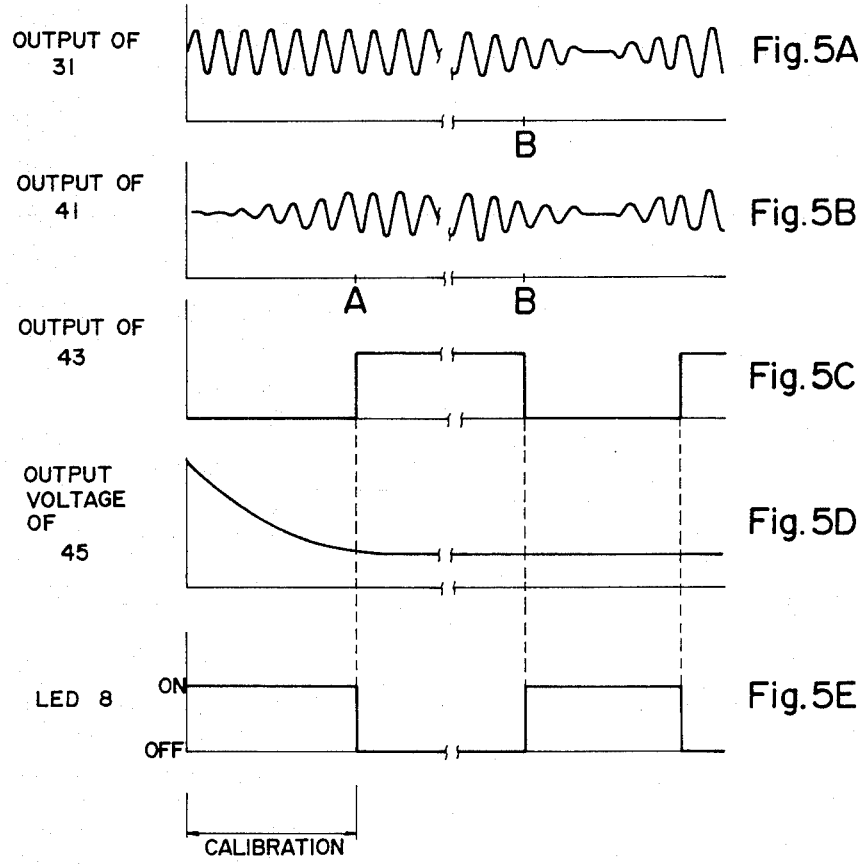
FIGS. 5A to 5E are respectively waveform charts illustrating the operation of a second control circuit responsible for detection of a metallic object.

The operation of the metallic object detecting section 30 will be discussed in the below. Upon energization of the circuit by closing the main switch 6, the amplifier 41 is controlled by the calibration means 45 to first operate at a minimum amplification factor to provide an electric signal of a reduced level (FIG. 5B), representative of the electric signal (FIG. 5A) which is obtained from the sensor 31 and kept at a constant level in the absence of the metallic object in proximity to the sensor 31. In this condition, the judging means 43 responds to provide a low level output (FIG. 5C), which is applied to the driver 44 to turn on the LED 8 (FIG. 5E). Immediately thereafter, the calibration means 45 acts to apply a progressively decreasing voltage to the amplifier 41 so as to correspondingly increase the level of the electric signal (FIG. 5B) and therefore the level of the output voltage of the integrator 42 until it goes just above the predetermined threshold level. Once this occurs (at time A in FIG. 5B), the calibration means 45 fixes its output voltage applied to the amplifier 41, i.e., the amplification factor of the amplifier 41 so that the sensor output will be compared with the threshold level based upon thus fixed or latched amplification factor. At this instance, the judge means 43 provides the high level output (FIG. 5C) to turn off the LED 8, which indicates that the initialization or calibration sequence is completed. Thus, in this sequence the output level of the integrator 42 can be automatically adjusted to be around the threshold level with which it is to be compared in the subsequent operation, thereby determining the above second reference level to be a most effective or sensitive value in detecting the metallic object behind a wall surface depending upon the particular wall intended. After the calibration sequence is completed, the metallic object detecting section 30 can be prepared to continue monitoring the output level of the sensor 31 during which period the LED 8 will turn on when there is sensed any reduction in the output level of the sensor 31 due to the presence of a metallic object in proximity to the sensor 31, which is shown at a time B in FIGS. 5A and 5B.

Referring back to FIGS. 2 and 3, a plurality of electrical components forming the above circuit are received within the casing 1 in such a manner that the capacitor sensor 11 is positioned along the flat bottom surface of the casing 1 and the magnetic field sensor 31 is positioned at the front end of the circular head 3, while the battery 5 is positioned in the rear end of the grip 2. The other components are mounted on a circuit board 9 with the LEDs 7 and 8 exposed to the top surface of the head 3. The main switch 6 is a momentary switch which is actuated by the switch button 4 to energize the above circuit only during the switch button 4 is being pressed.

Figure 6:
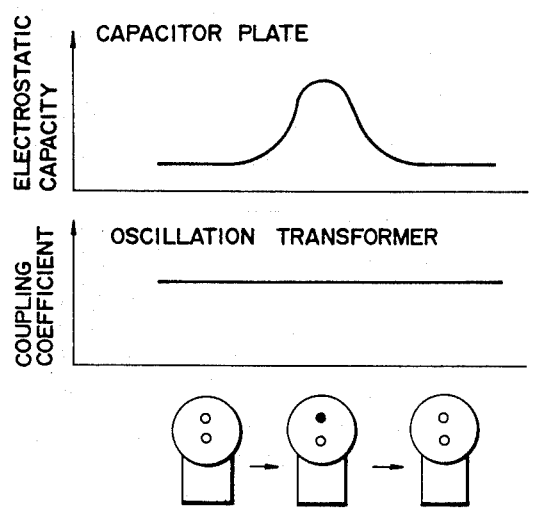
FIG. 6 is an explanatory view illustrating the operation of the detector when sensing a non-metallic object.
Figure 7:
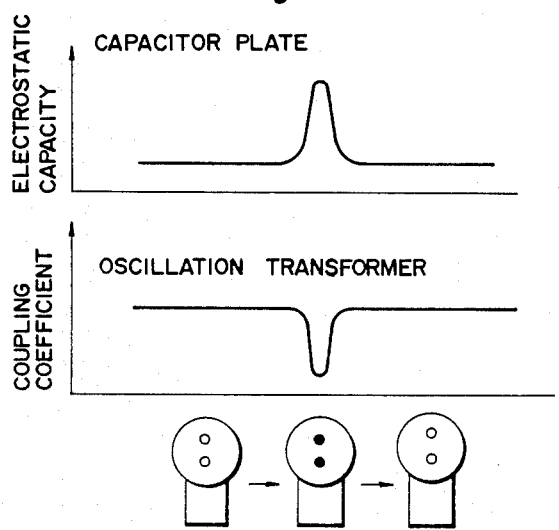
FIG. 7 is an explanatory view illustrating the operation of the detector when sensing a metallic object.

In operation, the detector is held against a target wall with the flat bottom of the casing 1 in a closely adjacent relation to the wall surface and is moved therealong. During this movement, only the LED 7 will light when there is detected a non-metallic object behind the wall surface as shown in FIG. 6. While on the other hand, when a metallic object is detected behind the wall surface, both of the LEDs 7 and 8 will light simultaneously, as shown in FG. 7. Thus, the user can easily distinguish between the metallic object and the non-metallic object at once in the operation of moving the detector along the wall.

Figure 8:
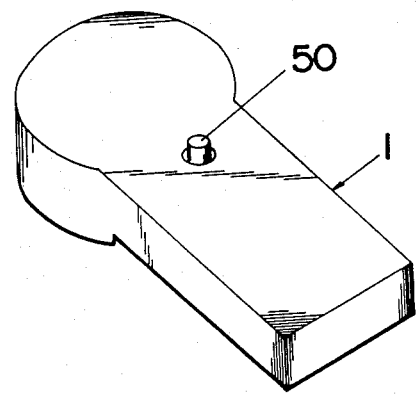
FIG. 8 is a perspective view of a modification of the above embodiment.

Referring to FIG. 8, there is shown a modification of the above embodiment which is identical to the above embodiment except that a reset rod 50 is provided to project outwardly of the flat bottom surface of the casing 1 and that the main switch is bistable switch to be actuated by the like switch button (not shown). The rest switch rod 50 is operatively connected to and actuates simultaneously a pair of reset switches (not shown) which are momentary switches inserted in the circuit in order to reset the respective calibration means 28 and 45. In use, the detector is firstly energized by pressing the switch button to close the main switch. Since the main switch is bistable, there is no need to keep pressing the switch button during the subsequent detection sequence. After the detector is thus energized it is held against a target wall in such a manner that the reset rod 50 is pressed in by the wall surface to rest the calibration means 28 and 45, whereby providing an optimum sensitivity depending upon the specific characteristics of the target wall with respect to each of the general object detecting section 10 and the metallic object detecting section 30. When it is required to shift the detector to another wall of different characteristics, the only procedure that is required is to place the detector against such another wall surface, whereby the reset rod 50 is actuated to reset the individual calibration means. Consequently, the detector can have automatically adjusted sensitivity well reflecting the characteristics of the new target wall without resorting to re-pressing the switch handle. In addition, the rest rod 50 finds itself as a useful probe by which the detector can be kept at a constant distance from the wall surface during the operation of moving the detector along the wall surface. This is particularly required to obtain reliable detection results and avoid an erroneous result which would be likely if there is considerable fluctuation in the distance between the detector and the wall surface.

Figure 9:
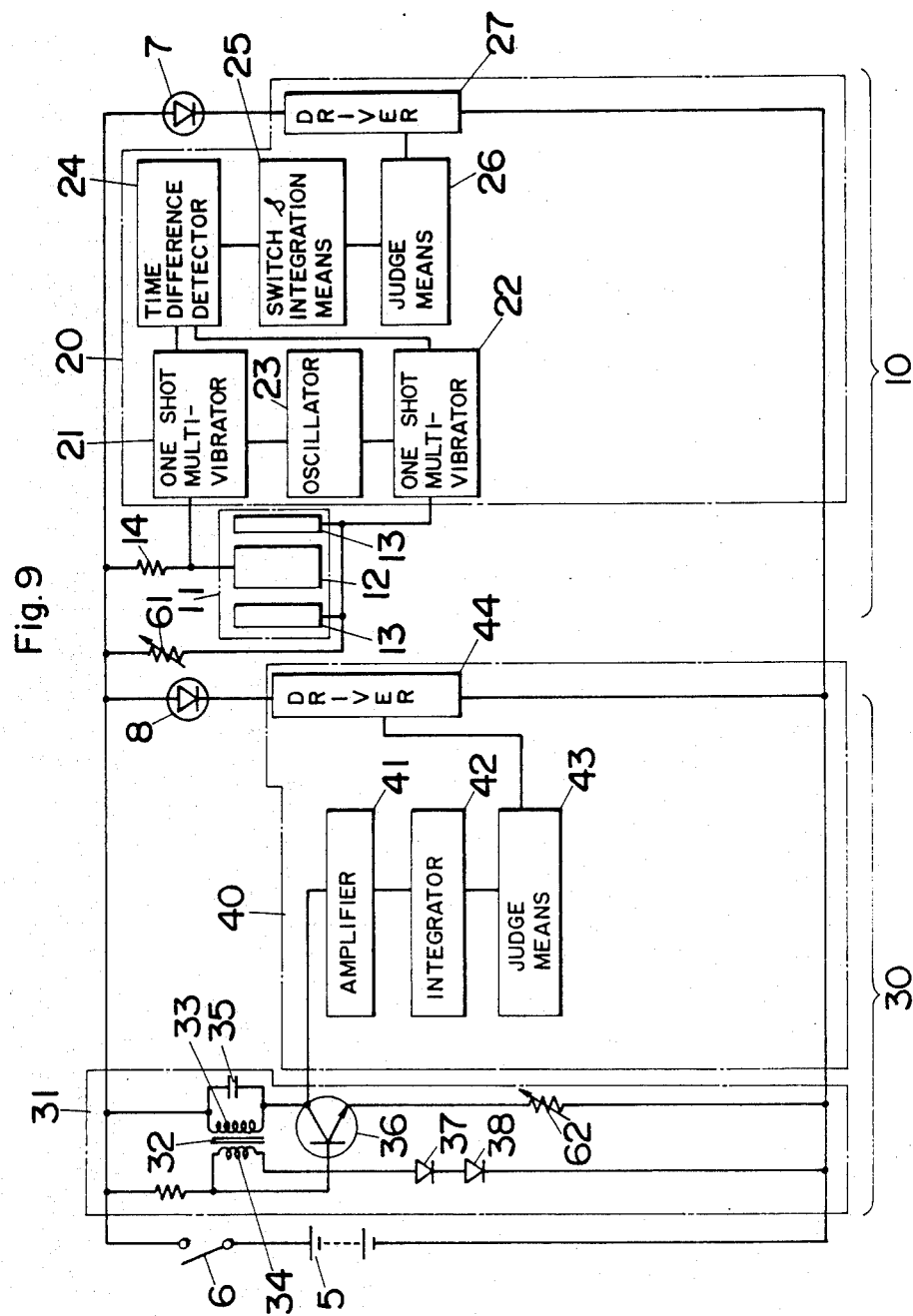
FIG. 9 is a circuit diagram of a combination detector for locating metallic and non-metallic objects behind a wall surface in accordance with a second embodiment of the present invention.
Figure 10:
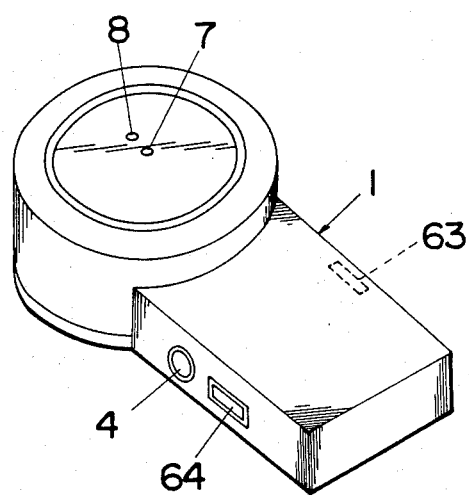
FIG. 10 is a perspective view of the detector of FIG. 9.

FIGS. 9 and 10 show a second embodiment of the present invention which is identical to the above embodiment except that separate potentiometers 61 and 62 are provided in circuit as substitutes for the calibration means 28 and 45. The potentiometers 61 and 62 can be adjusted respectively by separate dials 63 and 64 mounted on the opposite sides of the casing 1. After energizing the circuit and placing the detector against a target wall, the detector can be adjusted to have an optimum sensitivity suitable for a particular target wall by adjusting the potentiometers 61 and 62 individually to such values at which the LEDs 7 and 8 are turned from the ON condition to the OFF condition. The subsequent detecting operation can be made in the same manner as in the above embodiment.

What is claimed is:

1. A detector for locating an object behind a wall surface and for determining whether said object is electrically conductive or non-conductive, said detector comprising:
a capacitor sensor comprising means for sensing any change in the capacitance of the wall to provide a first electric signal indicative of that change;
a first control circuit, connected to said capacitor sensor, for receiving and analyzing the first electric signal from the capacitor sensor to produce a first control output when the level of the first electric signal reaches a first reference level;
a magnetic filed sensor comprising means for creating a magnetic field around said wall and in turn for detecting any change in the magnetic field to provide a second electric signal indicative of that change;
a second control circuit, connected to said magnetic field sensor, for receiving and analyzing the second electric signal from the magnetic field sensor to produce a second control output when the level of the second electric signal reaches a second reference level;
a display circuit, connected to said first control circuit and said second control circuit, comprising indication means for enabling simultaneous determination of whether said first control output has been output by said first control circuit and said second control output has been output by said second control circuit, said indication means comprising a first indicator producing a first indication responsive to the first control output from the first control circuit and a second indicator disposed adjacent said first indicator and producing a second indication responsive to the second control output from the second control circuit; and
a common battery energizing the above mentioned elements so that said first and second control circuits are simultaneously operative to provide the first and second indications when there is a metallic object behind the wall surface causing the changes both in the magnetic field and in the capacitance sensed and to provide only the first indication when there is a non-metallic object behind the wall surface causing the changes only in the capacitance sensed.

2. A detector as set forth in claim 1, wherein each of the first and second control circuits includes a calibration means by which each of said first and second reference levels is made variable so that it is set upon the initial energization sequence of the associated on of the the first and second control circuits to a value at which each of said first and second indicators responds to turn from the indicating condition to the non-indicating condition.

3. A detector as set forth in claim 2, wherein said calibration means is arranged to turn each of the first and second indicators into the indicating condition upon the initial energization of the associated on of the the first and second control circuits and to progressively vary each of said first and second reference levels in a direction of turning each of said first and second indicators into its non-indicating condition in order to determine the reference level to and latch into a value at which each one of the first and second indicators is turned first into the non-indicating condition.

4. A detector as set forth in claim 2, wherein each of said calibration means comprises a variable resistor connected in circuit to vary the level of each of the first and second electric signals respectively from the magnetic field sensor and the capacitor sensor.

5. A detector as set forth in claim 1, wherein said means for creating a magnetic field comprises an oscillatory circuit which can vary its output level in response to any change in the alternating magnetic field developed thereby.

6. A detector as set forth in claim 1, wherein said means for sensing comprises capacitor plates adapted in use to be placed in a close relation to the wall surface for detecting any change in the capacitance of the capacitor plates due to a change in the dielectric constant of the wall.

7. A detector as set forth in claim 1, wherein each of the first and second indicators comprises a light emitting diode which produces a light as the indication of the presence of the object behind the wall surface.

8. A detector as set forth in claim 1, further comprising:
- a casing incorporating therein electric components forming said capacitor sensor, said magnetic field sensor, said first and second control circuits, said display circuit, and said common battery, said casing having a flat surface inside of which said capacitor sensor and said magnetic field sensor are mounted and which is adapted in use to be placed against the wall surface;
- each of said first and second control circuits including a calibration means, each calibration means being arranged to turn each of the first and second indicators into the indicating condition responsive to initial energization of the control circuit and to progressively vary each of said first and second reference levels in a direction of turning each of said first and second indicators into its non-dictating condition in order to determine the reference level to and latch into a value at which each indicator is turned first into the non-indicating condition; and
- each calibration means including a reset switch actuable by a reset rod which projects outwardly of said flat surface to be abuttable against the wall surface so that the calibration means can be reset each time the detector is placed against the wall surface with its reset rod abutted thereagainst.

* * * * *